United States Patent
Yang et al.

(10) Patent No.: US 10,146,317 B2
(45) Date of Patent: Dec. 4, 2018

(54) VEHICLE ACCESSORY OPERATION BASED ON MOTION TRACKING

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 471 days.

(21) Appl. No.: 14/568,481

(22) Filed: Dec. 12, 2014

(65) Prior Publication Data

US 2016/0167486 A1 Jun. 16, 2016

(51) Int. Cl.
*G06F 3/01* (2006.01)
*B60S 1/08* (2006.01)
*B60J 7/057* (2006.01)

(52) U.S. Cl.
CPC ............. *G06F 3/017* (2013.01); *B60S 1/08* (2013.01); *B60J 7/0573* (2013.01); *B60S 1/0896* (2013.01)

(58) Field of Classification Search
None
See application file for complete search history.

(56) References Cited

U.S. PATENT DOCUMENTS

| 8,170,186 | B2 | 5/2012 | Kuiken | |
|---|---|---|---|---|
| 8,258,917 | B2 | 9/2012 | Cai et al. | |
| 9,117,318 | B2 * | 8/2015 | Ricci | H04W 4/21 |
| 9,317,983 | B2 * | 4/2016 | Ricci | H04W 4/21 |
| 2009/0278915 | A1 | 11/2009 | Kramer et al. | |
| 2010/0032980 | A1 * | 2/2010 | Miller | E05F 15/695 296/146.1 |
| 2011/0227820 | A1 | 9/2011 | Haddick et al. | |
| 2012/0274549 | A1 | 11/2012 | Wehling et al. | |
| 2012/0319940 | A1 | 12/2012 | Bress et al. | |
| 2013/0261871 | A1 | 10/2013 | Hobbs et al. | |
| 2014/0118244 | A1 * | 5/2014 | Kaplan | G06F 3/017 345/156 |
| 2014/0222333 | A1 * | 8/2014 | Mertens | G01P 15/00 701/472 |
| 2014/0309871 | A1 * | 10/2014 | Ricci | B60Q 1/00 701/36 |

FOREIGN PATENT DOCUMENTS

| DE | 102012203535 A1 | 9/2013 | |
|---|---|---|---|
| WO | WO 2011131962 A1 * | 10/2011 | ............. G08C 17/02 |

* cited by examiner

*Primary Examiner* — Jean Paul Cass
(74) *Attorney, Agent, or Firm* — Frank A. MacKenzie; Brooks Kushman P.C.

(57) ABSTRACT

A vehicle includes a vehicle computing system (VCS) and a vehicle accessory system that may be a window wiper mechanism, a power lift gate, a door lock mechanism, a convertible mechanism or a sunroof mechanism. The VCS communicates with an activity tracking band worn on a wrist of a vehicle occupant. The activity tracking device detects motion of the wrist of the occupant, and is capable of exchanging that data with the VCS. The VCS generates at least one output signal based on data from the activity tracking device. For example, a controller may activate a window wiper mechanism based on signals indicative of a detected long wiping motion.

16 Claims, 4 Drawing Sheets

VEHICLE ACCESSORY OPERATION BASED ON MOTION TRACKING

TECHNICAL FIELD

This application is generally related to the activation and operation of a vehicle accessory system based on detection of an occupant's gesture by a wearable device.

BACKGROUND

Improvements in three-dimensional accelerometers have been instrumental in increasing the acceptance of personal activity tracking devices. Personal activity tracking devices can measure movement of the wearer and are able to detect and record physical activity such as walking, running and exercising. Personal activity tracking devices also may be equipped with connection means including but not limited to Bluetooth, Ethernet, USB, WiFi, and IrDA, used to connect with a mobile phone running application software, a server connected with the cloud or a vehicle computing system. A wrist mounted wearable device or personal activity tracking device allows for detection of wrist movement.

SUMMARY

A vehicle includes a window wiper motor assembly configured to move a wiper on a window, and at least one controller. The at least one controller is configured to communicate with at least one personal activity tracking device capable of outputting a signal indicative of a hand motion of an occupant. In response to the signal indicating a horizontal side to side wiping motion, the at least one controller activates the assembly.

A vehicle includes a roof assembly configured to move a roof covering, and at least one controller. The at least one controller is configured to communicate with at least one personal activity tracking device capable of outputting a signal indicative of a hand motion of an occupant. In response to the signal indicating a pointing motion towards the covering followed by a swiping motion in a direction of desired travel, the at least one controller activates the assembly to move the covering in the direction.

A vehicle includes a window assembly configured to move a window, and at least one controller. The at least one controller is configured to communicate with at least one personal activity tracking device capable of outputting a signal indicative of a hand motion of an occupant. In response to the signal indicating a series of two swiping motions within a predetermined time, the at least one controller activates the assembly to move the window.

DETAILED DESCRIPTION

Figure 1:
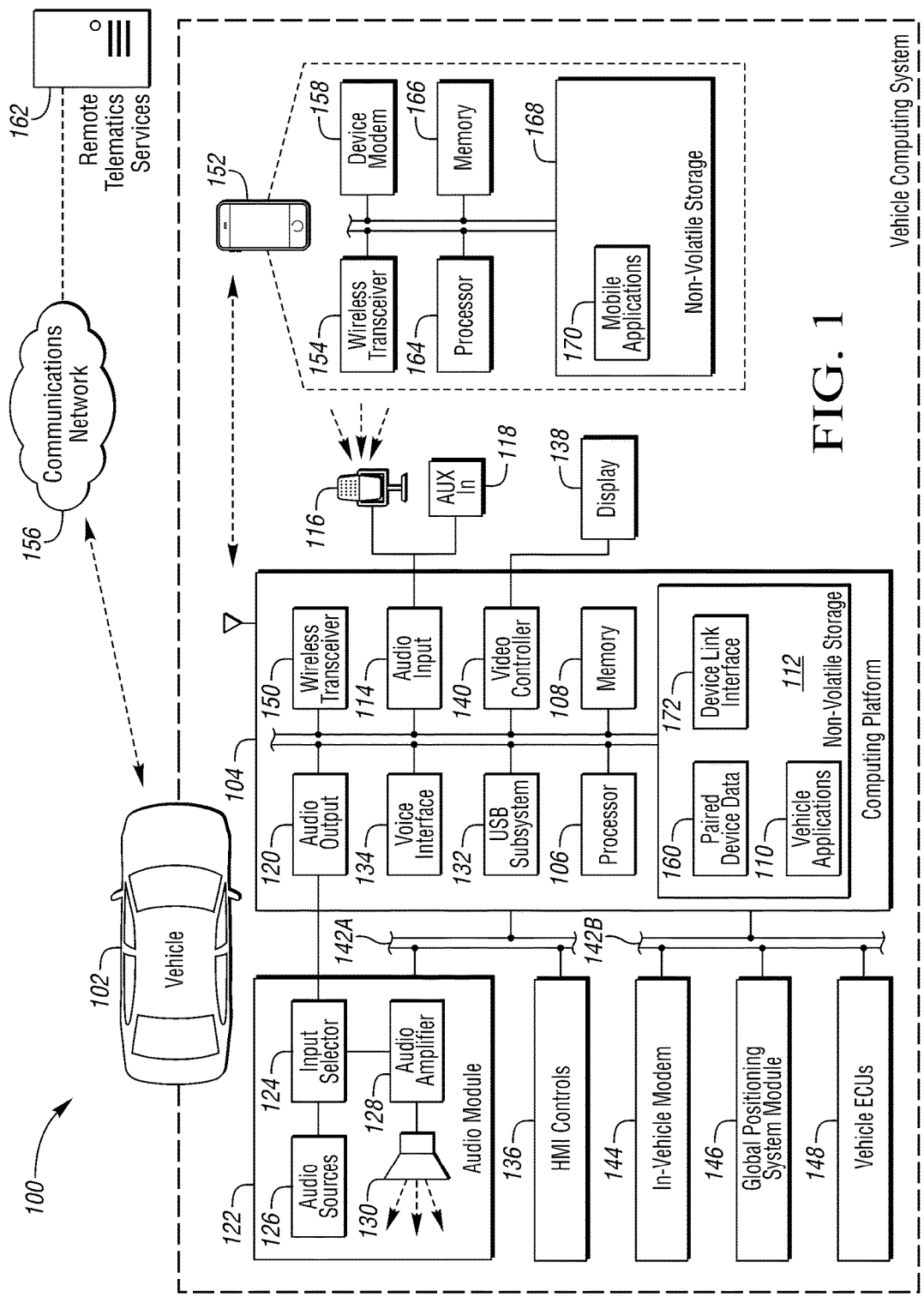
FIG. 1 is an exemplary block topology of a vehicle infotainment system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes vehicular systems and methods for controlling a vehicular sub-system including but not limited to a door lock, a door opening assembly, a sliding door assembly, a window wiper assembly (e.g., windshield wiper or rear window wiper), a roof assembly (e.g., a convertible top, a sunroof, a moon-roof, or a panoramic-roof), which may include transparent, translucent, and opaque materials or a combination thereof. The vehicular sub-system may communicate with other vehicular modules via a wire-line or wireless communication protocol. The communication protocol may include but is not limited to CAN, LIN, FlexRay, Ethernet, WiFi, and Bluetooth. The vehicular sub-system may communicate either directly or indirectly with a personal activity tracking device. The personal activity tracking device may include but is not limited to a wrist band, a smart watch, or a smart ring. The personal activity tracking device includes a wireline or wireless communication port such as WiFi and Bluetooth, and motion sensors such as accelerometers and gyroscopes, and may include other circuitry including circuitry capable of determining a location. The location determination may be a geographical location such as from a GPS unit, or a relative location such as one triangulated within the passenger compartment of a vehicle.

The personal activity tracking device may transmit a signal to the vehicular sub-system either on a continuous basis, at discrete time intervals, based on motion detected by the personal activity tracking device or when requested by the vehicular sub-system. The vehicular sub-system may activate based on the signal from the personal activity tracking device, wherein the signal from the personal activity tracking device is indicative of a hand motion or gesture. The hand motion may be a single movement or a combination of movements. A detecting threshold may be set on the signals proportional to the hand motion acceleration, speed or direction.

FIG. 1 illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134. The device link interfaced 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

Figure 2A:
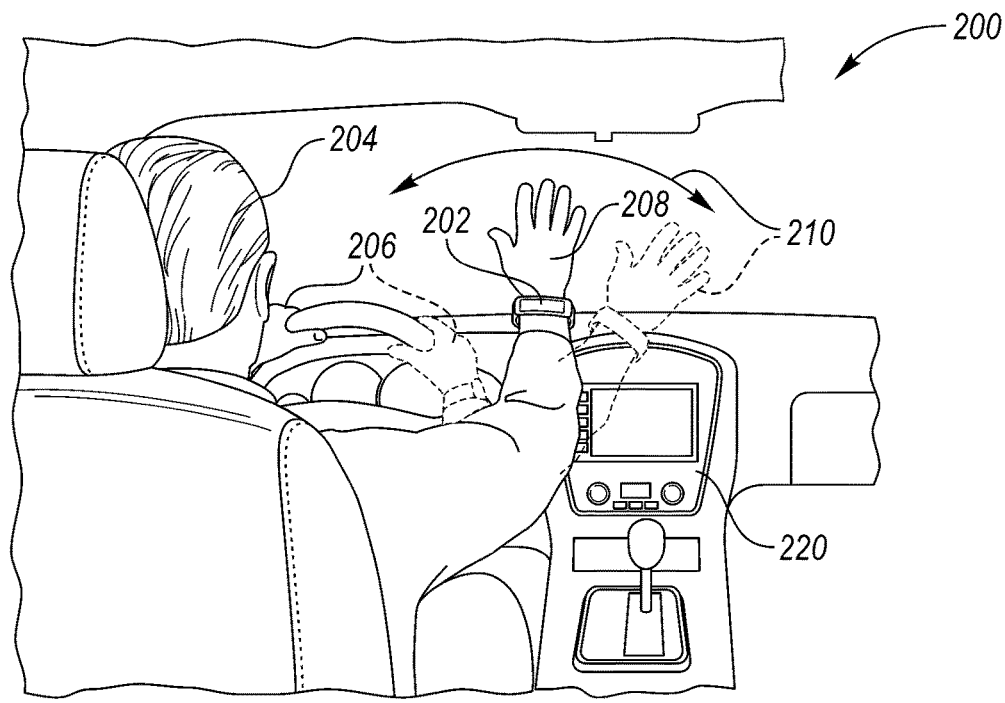
FIG. 2A is an exemplary illustration of a vehicle interior including a vehicle infotainment system and an occupant making a wiping gesture.

FIG. 2A is an exemplary illustration of a vehicle interior 200 including a vehicle infotainment system 220 and an occupant 204 within the vehicle interior 200. The occupant 204 may wear a personal activity tracking device 202. The personal activity tracking device 202 may be a smart fitness band, a smart watch, a smart phone wrist band, or other electronic system attached to the occupant's wrist. The personal activity tracking device 202 may be equipped with motion sensors, including an accelerometer (e.g., 3-axis accelerometer), a gyroscope, and a magnetometer. The personal activity tracking device may detect a wrist movement or series of movements. The detected movement or series of movements may be evaluated by a controller and interpreted as a gesture. If the occupant 204 is an operator of the vehicle, the occupant may have his hands on the steering wheel in a driving position 206. From the driving position 206, a wiping gesture made by the occupant 204 detected by the activity tracking device 202 and communicated to the vehicle by the wireless connection may cause the vehicle to activate a window wiping mechanism. For example, the personal activity tracking device 202 may be configured to detect a movement from the driving position 206 wherein the hand is extended in a direction of the window 208, followed by movement of the hand in a side to side waving motion 210 parallel to the plane of the window. The gesture may be indicative of an occupant's desire to have a window cleaned or wiped with an automatic wiper. Thus a controller in the vehicle may activate the window wiping mechanism in response to the signals received from the personal activity tracking device. Further, the window wiping mechanism may operate at a speed proportional to the speed of motion of the hand in the side to side motion 210

In response to the wiping gesture of FIG. 2A detected and classified by the controller, the controller may then activate a window wiping mechanism via a communication link between the controller and a vehicle ECU controlling the mechanism. The controller and the vehicle ECU may be coupled via a wire connection including a CAN bus, a Flexray bus, an Ethernet bus, or a MOST bus or may be connected via a wireless connection. The other vehicle ECUs may include a body control module (BCM), a steering column control module, a door module, a window lift module, a lift-gate module, a sliding door module, or a power roof module via a wire connection including a CAN bus, a Flexray bus, an Ethernet bus, or a MOST bus. The signals may be indicative of gestures to open, close or operate multiple systems including sliding doors, rear lift gates, power roof assemblies, windows, etc.

Figure 2B:
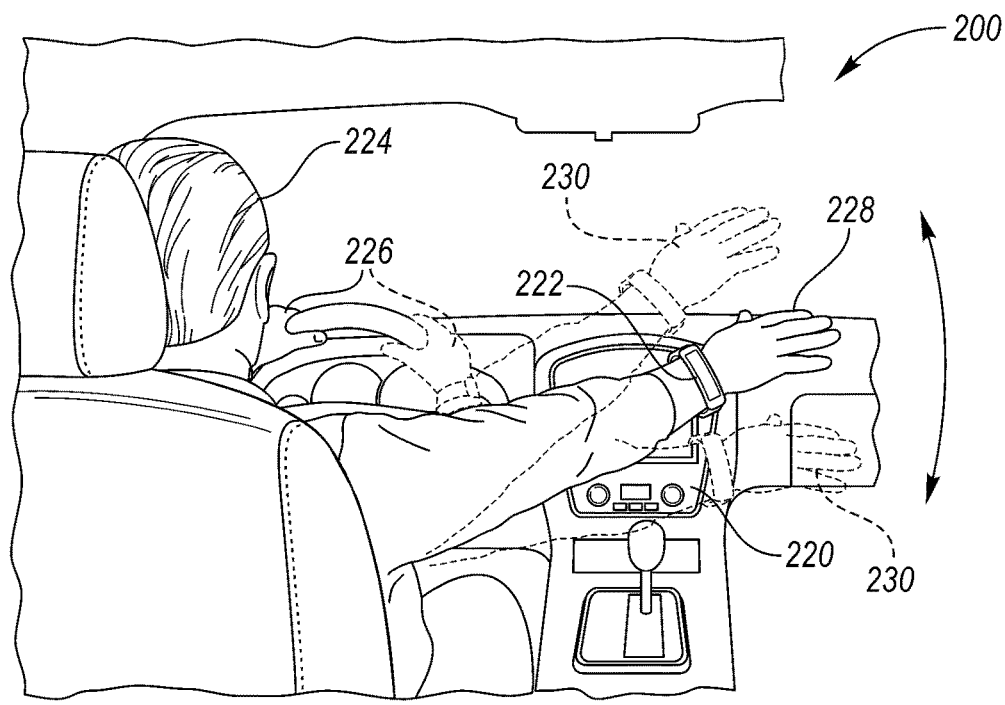
FIG. 2B is an exemplary illustration of a vehicle interior including a vehicle infotainment system and an occupant making a flicking gesture.

FIG. 2B is an exemplary illustration of a vehicle interior 200 including a vehicle infotainment system 220 and an occupant 224 within the vehicle interior 200. The occupant 224 may wear a personal activity tracking device 222. The personal activity tracking device 222 may be a smart fitness band, a smart watch, a smart phone wrist band, or other electronic system attached to the occupant's wrist. The personal activity tracking device 222 may be equipped with motion sensors, including an accelerometer (e.g., 3-axis accelerometer), a gyroscope, and a magnetometer, such that a wrist movement or series of movements may be detected. The detected movement or series of movements may be evaluated by a controller and interpreted as a gesture. If the occupant 224 is an operator of the vehicle, the occupant may have his hands on the steering wheel in a driving position 226. From the driving position 226, a waving gesture made by the occupant 224 detected by the activity tracking device 222 and communicated to the vehicle by the wireless connection may cause the vehicle to activate a window assembly. For example, the personal activity tracking device 222 may be configured to detect a movement from the driving position 226 wherein the hand is extended in a direction toward the window 228, followed by movement of the hand in an up and down motion 230. The gesture may be indicative of an occupant's desire to have a window raised or lowered with an automatic window lift assembly. Thus a controller in the vehicle may activate the window assembly in response to the signals received from the personal activity tracking device. Further, the window assembly mechanism may operate at a speed proportional to the speed of motion of the hand in the side to side motion 210.

The gesture illustrated in FIGS. 2A and 2B may be preceded by an activation signal such as a button press, a voice command or a signal indicative of a specific hand motion. An example of a hand motion to activate gesture recognition may include a twist of the wrist, a movement toward a specific vehicle accessory system coupled to a vehicular ECU.

Figure 3:
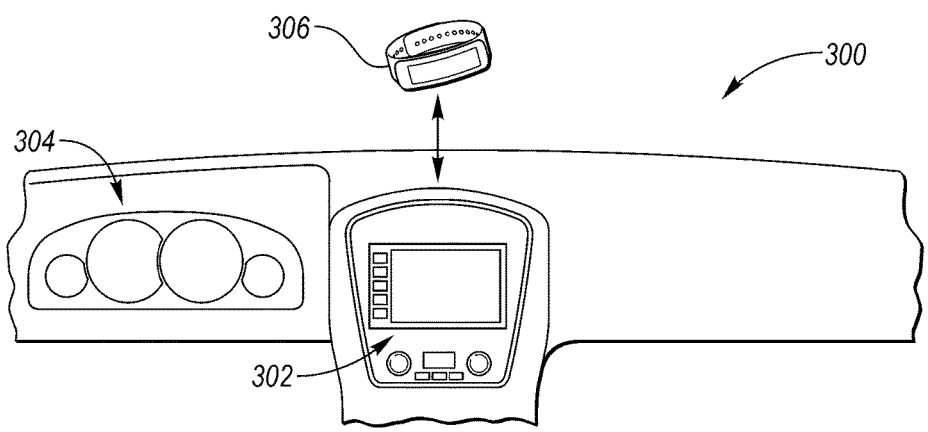
FIG. 3 is an exemplary activity tracking device in communication with a vehicle based computing system.

FIG. 3 is an exemplary illustration of a vehicle interior, specifically a vehicle dash board 300 including a vehicle infotainment system 302 and a vehicle instrument cluster 304. The vehicle infotainment system 302 and vehicle instrument cluster 304 may be coupled via a wire connection including a CAN bus, a Flexray bus, an Ethernet bus, or a MOST bus or may be connected via a wireless connection. The vehicle infotainment system 302 and vehicle instrument cluster 304 may be coupled to other vehicle modules (not shown) including Body Control Modules (BCM), Powertrain Control Modules (PCM), and other vehicular ECUs via a wire connection including a CAN bus, a Flexray bus, an Ethernet bus, or a MOST bus. The vehicle infotainment system 302 and vehicle instrument cluster 304 may be coupled to an activity tracking devices 306 via a wireless connection including Bluetooth, WiFi, or inductive coupling. The activity tracking device 306 may communicate with the controller via a wireless or wire connection.

Figure 4:
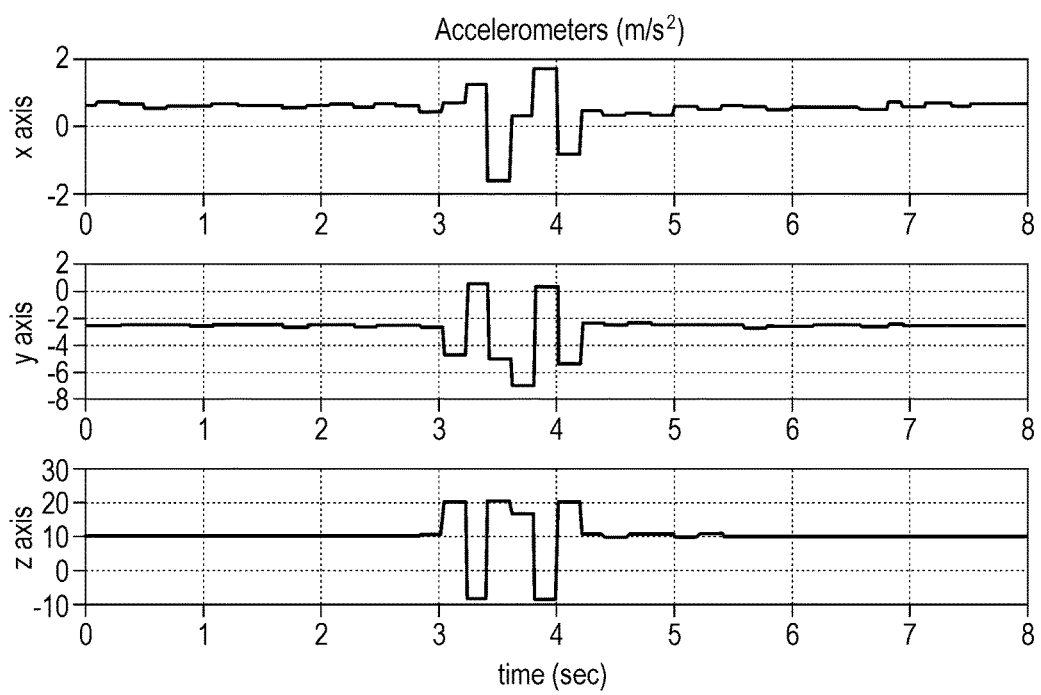
FIG. 4 is an exemplary graphical view of accelerometer signals with respect to time during a gesture movement.

FIG. 4 shows exemplary accelerometer signals from a personal activity tracking device. Sensor signals are processed in a hand motion detection module. The hand motion detection module may reside in the personal activity tracking device, in the cloud, or in a controller in the vehicle. The hand motion detection module may be used to recognize hand gestures utilized by the controller. The controller may communicate with corresponding vehicle sub-systems for decision-making, such as activating a window wiping mechanism.

Figure 5:
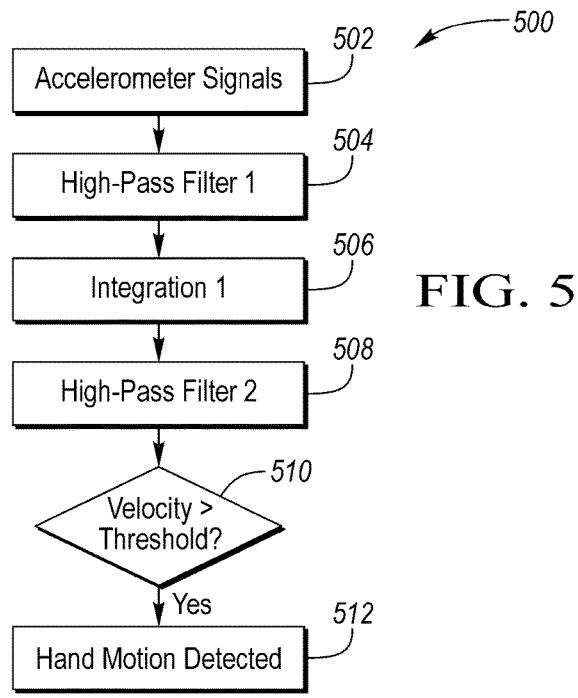
FIG. 5 is an exemplary motion sensor processing flow diagram for hand gestures.

The graphical illustration of FIG. 4 is raw accelerometer signals of a sequence of hand motions. The raw signals have significant bias (especially the gravitational acceleration in z-axis). FIG. 5 is an exemplary data processing flowchart 500 used to detect hand motion. In step 502, the motion signals from the personal activity tracking device is received by the hand motion detection module. In step 504, the motion sensor signals, such as accelerometer signals, may be processed by a filter, the filter may be an analog or digital filter, and the filter may be a high-pass filter or a band-pass filter. An example of a filter is a high pass filter shown as Equation 1 below.

$$y_i = \alpha \cdot (y_{i-1} + x_i - x_{i-1}) \qquad (1)$$

where x is the input, y is the output and a is the time constant.

Figure 6:
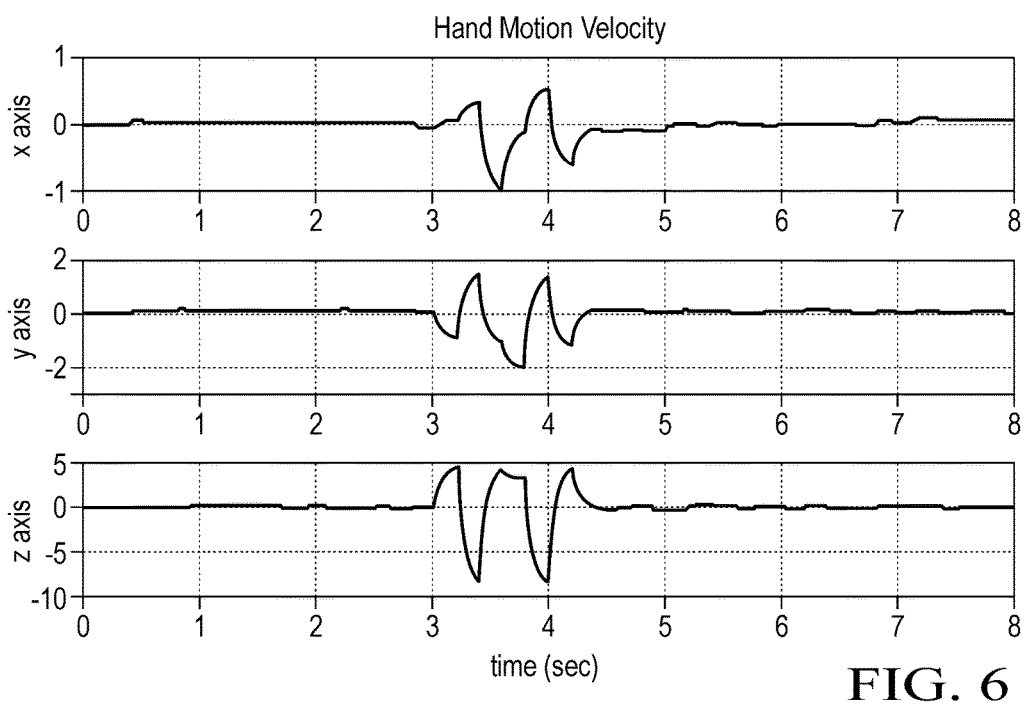
FIG. 6 is an exemplary graphical view of calculated hand motion velocity signals with respect to time during a gesture movement.

The high-pass filtered accelerometer signals from step 504 may be integrated in step 506 to obtain a velocity. The velocity may be filtered with another high-pass filter similar to Equation 1 to remove offset drift as shown in step 508. The output may then be qualified by a comparison with a threshold as illustrated in 510. If the output is greater than the threshold, the motion may be analyzed to determine if the motion constitutes one gesture selected from a plurality of gestures as shown in block 512. FIG. 6 illustrates exemplary waveforms from a personal activity tracking device after the data is processed by the hand motion detection flowchart of FIG. 5.

The calculated velocity can be used to estimate the hand waving motion. FIG. 6 shows the estimated hand waving motion on the calculated velocity signals. The calculated velocity signals show the hand wave twice rapidly within one second. Thresholds are set to define the hand gesture for corresponding vehicle features such as activating a widow wiper.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a window wiper motor assembly configured to move a wiper on a window; and
at least one controller configured to
communicate with at least one personal activity tracking device that outputs a signal indicative of a hand motion of at least one occupant, and
in response to the signal indicating a horizontal side to side wiping motion, activate the assembly.

2. The vehicle of claim 1, wherein the window is a front windshield.

3. The vehicle of claim 1, wherein the at least one controller is further configured to activate the assembly with a speed proportional to a speed of the side to side wiping motion.

4. The vehicle of claim 1, wherein the at least one controller is further configured to filter the signal to generate a filtered signal, integrate the filtered signal to generate an integrated signal, and filter the integrated signal to generate a velocity indicative of a velocity of the hand motion, and wherein the at least one controller is further configured to activate the assembly in response to the velocity being greater than a threshold.

5. The vehicle of claim 1, wherein the at least one controller communicates with the at least one activity tracking device via a mobile phone.

6. The vehicle of claim 1, wherein the at least one personal activity tracking device is a driver's personal activity tracking device or a passenger's personal activity tracking device.

7. The vehicle of claim 1, wherein the at least one controller is further configured to triangulate a position of the at least one occupant in the vehicle based on the signal.

8. A vehicle comprising:
a roof assembly configured to move a roof covering; and
at least one controller configured to
communicate with at least one personal activity tracking device that outputs a signal indicative of a hand motion of at least one occupant, and
in response to the signal indicating a pointing motion towards the covering followed by a swiping motion in a direction of desired travel, activate the assembly to move the covering in the direction.

9. The vehicle of claim 8, wherein the at least one controller is further configured to communicate with the at least one activity tracking device via a mobile phone.

10. The vehicle of claim 8, wherein the at least one controller is further configured to filter the signal to generate a filtered signal, integrate the filtered signal to generate an integrated signal, and filter the integrated signal to generate a velocity indicative of a hand motion velocity, and wherein the at least one controller is further configured to activate the assembly in response to the velocity being greater than a threshold.

11. The vehicle of claim 8, wherein the at least one personal activity tracking device is a driver's personal activity tracking device or a passenger's personal activity tracking device.

12. The vehicle of claim 8, wherein the covering is a sunroof, a moon-roof, a panoramic roof, or a convertible rooftop.

13. A vehicle comprising:
a window assembly configured to move a window; and
at least one controller configured to
communicate with at least one personal activity tracking device that outputs a signal indicative of a hand motion of at least one occupant, and
in response to the signal indicating a series of two swiping motions within a predetermined time, activate the assembly to move the window.

14. The vehicle of claim 13, wherein the at least one controller is further configured to communicate with the at least one personal activity tracking device using a radio frequency band of two gigahertz or greater.

15. The vehicle of claim 13, wherein the at least one controller communicates with the at least one activity tracking device via a mobile phone.

16. The vehicle of claim 13, wherein the at least one controller is further configured to triangulate a position of the at least one occupant in the vehicle based on the signal.

* * * * *